(12) United States Patent
Hashizume et al.

(10) Patent No.: US 12,358,603 B2
(45) Date of Patent: Jul. 15, 2025

(54) SYSTEM FOR DETECTING POSITION OF BOAT MOORED UNDER ROOF

(71) Applicant: Honda Motor Co., Ltd., Tokyo (JP)

(72) Inventors: Takashi Hashizume, Saitama (JP); Ryota Hisada, Tokyo (JP); Ryuichi Kimata, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 448 days.

(21) Appl. No.: 17/956,834

(22) Filed: Sep. 30, 2022

(65) Prior Publication Data

US 2024/0109637 A1 Apr. 4, 2024

(51) Int. Cl.
*B63H 25/04* (2006.01)
*G01C 21/20* (2006.01)

(52) U.S. Cl.
CPC ........... *B63H 25/04* (2013.01); *G01C 21/203* (2013.01); *B63B 2213/02* (2013.01); *B63H 2025/045* (2013.01)

(58) Field of Classification Search
CPC .. B63H 25/00; B63H 25/04; B63H 2025/045; G01C 21/00; G01C 21/203
USPC ....................................................... 114/39.11
See application file for complete search history.

(56) References Cited

U.S. PATENT DOCUMENTS 11,167,833 B2   11/2021   Akuzawa et al.

FOREIGN PATENT DOCUMENTS

CN   112649023 A   *   4/2021   ........... G01C 25/005

* cited by examiner

*Primary Examiner* — Lars A Olson
(74) *Attorney, Agent, or Firm* — JCIPRNET

(57) ABSTRACT

A control system, adapted for a boat having a first GNSS receiver disposed at a bow side of the boat, and a second GNSS receiver disposed at a stern side of the boat, the control system includes a control unit including a processor configured to determine whether an approach direction of the boat to a berth is bow first or stern first; and select, based on the approach direction, the first GNSS receiver or the second GNSS receiver for determining a position of the boat.

15 Claims, 5 Drawing Sheets

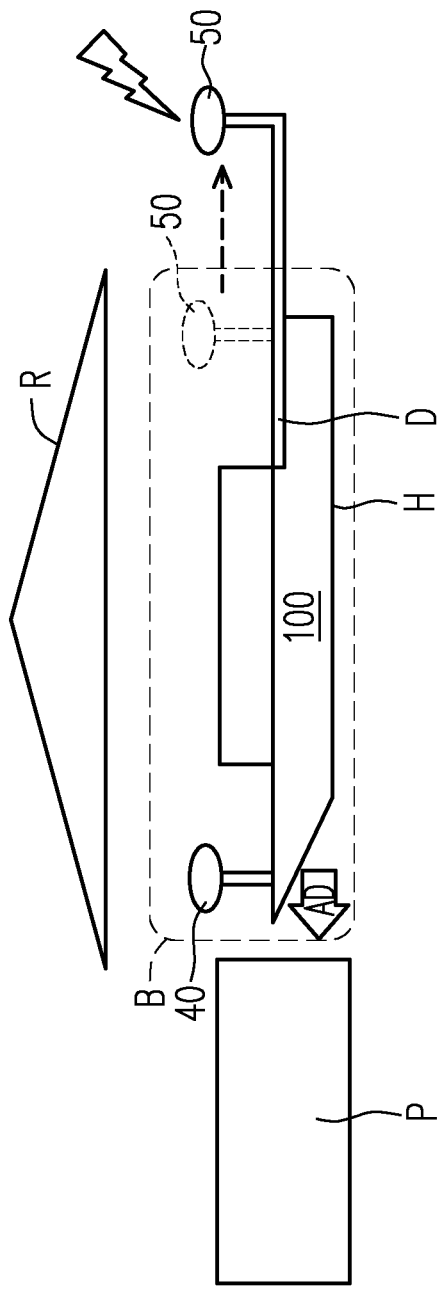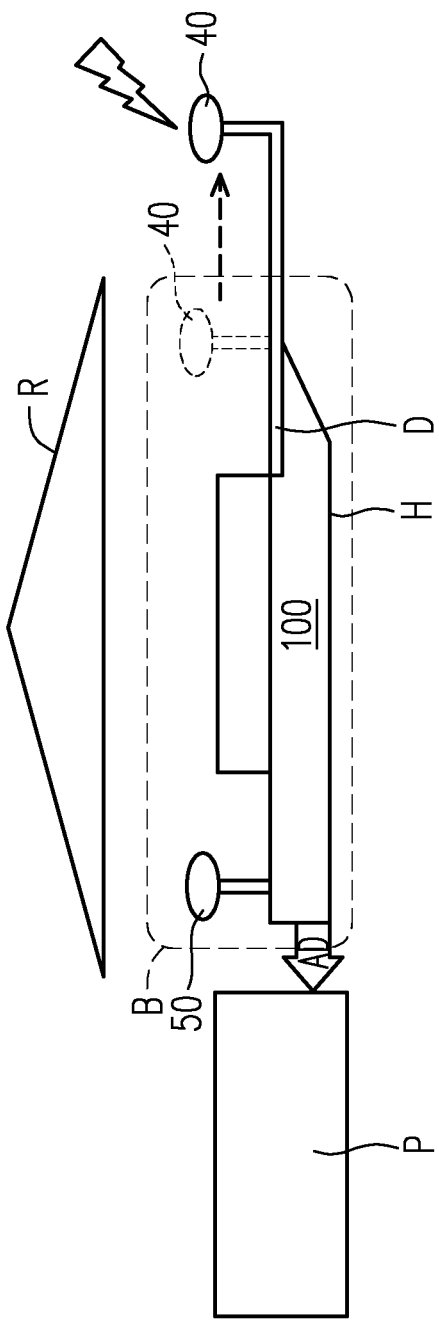

SYSTEM FOR DETECTING POSITION OF BOAT MOORED UNDER ROOF

BACKGROUND OF THE DISCLOSURE

Technical Field

The disclosure relates to a system for detecting a position of a boat, and more specifically relates to the system for detecting the position of the boat that is moored under a roof.

Related Art

When a boat is moored to a berth (at for example a port, harbor, dock or the like), a roof may cover the berth to protect the boat from rain, sunshine and/or the like. However, the roof may prevent the GPS receiver disposed on the boat from receiving a signal from a GPS satellite. In more detail, the roof covering the berth may shield the GNSS signal transmitted from the GPS satellite, such that a position of the boat is unable to be determined based on the GPS signal.

For example, when the boat is being moored to the berth, the GPS signal may cut off and/or weaken when the GPS receiver disposed on the boat enters under the roof. Similarly, when the boat is to depart from the berth, the GPS signal may be cut off and/or weak since the GPS receiver is under the roof and the GPS signal is shielded/blocked by the roof, such that a position of the boat is unable to be determined based on the GPS signal.

Therefore, a system for detecting a position of the boat that is to be moored to a berth having a roof is needed.

SUMMARY

According to an embodiment of the disclosure, a control system, adapted for a boat having a first GNSS receiver disposed at a bow side of the boat, and a second GNSS receiver disposed at a stern side of the boat is provided. The control system includes a control unit including a processor configured to determine whether an approach direction of the boat to a berth is bow first or stern first; and select, based on the approach direction, the first GNSS receiver or the second GNSS receiver for determining a position of the boat.

BRIEF DESCRIPTION OF THE DRAWINGS

Embodiments will now be described, by way of example only, with reference to the accompanying drawings which are meant to be exemplary, not limiting, and wherein like elements are numbered alike in several Figures.

FIG. 4 is a schematic diagram illustrating a side view of a boat having a second GNSS receiver moved away from a bow of the boat according to an embodiment of the disclosure;

FIG. 5 is a schematic diagram illustrating a side view of a boat having a first GNSS receiver moved away from a stern of the boat according to an embodiment of the disclosure;

DESCRIPTION OF THE EMBODIMENTS

Figure 1:
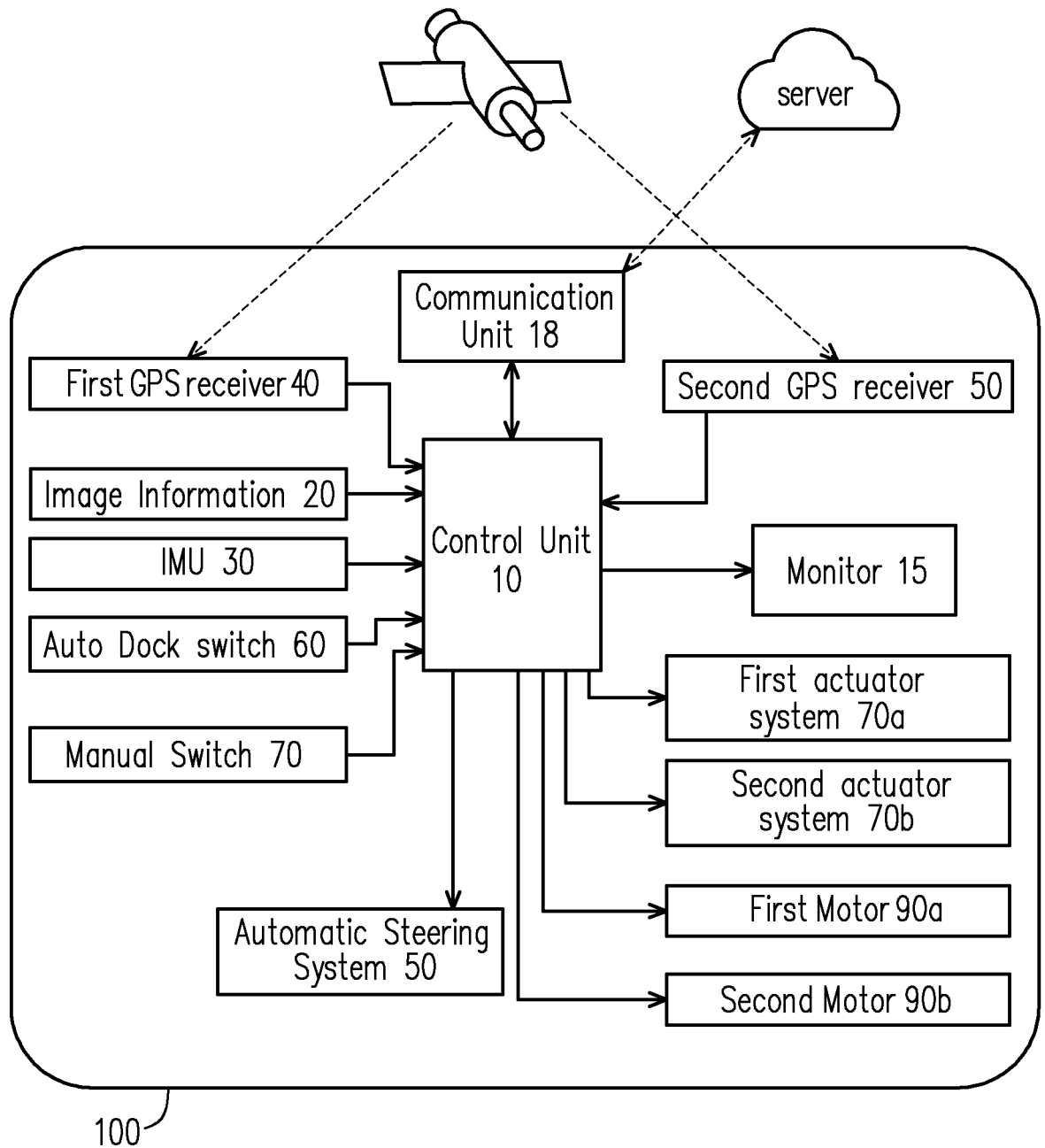
FIG. 1 is a schematic diagram illustrating a system for detecting a position of a boat that is moored under a roof according to an embodiment of the disclosure.

FIG. 1 is a schematic diagram illustrating a system for detecting a position of a boat that is moored under a roof according to an embodiment of the disclosure. Referring to FIG. 1, a boat 100 is provided. The boat 100 may be, for example, a water vessel, a water craft, a ship and/or the like. The boat 100 may be, for example, a speed boat, a catamaran, a pontoon and/or the like. The boat 100 is an example of a moving object. A vehicle, for example, a car is an example of the moving object. An airplane, submarine, drone and/or the like are examples of the moving object.

Referring to FIG. 1, a control unit 10 is disposed on the boat 100. The control unit includes, for example, a processor and a memory. In addition, a monitor 15 may be disposed on the boat 10. The monitor 15 is an example of a display unit. The monitor 15 is coupled to the control unit 10, wherein the control unit 10 may display an image on the monitor 15. The control unit 10 may be configured to receive an input from a user via an input unit. The input unit may include, for example, a computer mouse and/or a keyboard. In another embodiment, the monitor 15 may include, for example, a capacitive touch screen to act as a touch screen to receive input from the user. For example, a map of a port may be displayed on the monitor 15, wherein a user may specify a location (a berth) to moor the boat 100 via the input unit.

The boat 100 includes a propulsion system, for example, a first motor 90a and a second motor 90b for propelling the boat 100 in water. The first motor 90a and/or the second motor 90b may be, for example, an inboard motor, an outboard motor, a partially inboard-partially outboard motor and the like. A first propeller is coupled to an output shaft of the first motor 90a and a second propeller is coupled to an output shaft of the second motor 90b, wherein the first motor 90a drives a rotation of the first propeller, and the second motor 90b drives a rotation of the second propeller. The first motor 90a and the second motor 90b are attached to a stern side of the boat 100. The first motor 90a and the second motor 90b may be a gasoline motor, an electric motor and the like and is not intended to limit the disclosure.

The boat 100 includes a steering system, for example, a steering wheel coupled to a rudder to steer a direction of the boat 100. The steering wheel may be coupled to the rudder by, for example, a cable or a wire or the like. The boat 100 further includes a manual driving mode and an automatic driving mode. An automatic docking mode is an example of an automatic driving mode. An automatic cruising mode is an example of an automatic driving mode. More specifically, the boat 100 includes an automatic steering system 50 for automatically driving/steering the boat in the automatic driving mode. More specifically, the boat 100 includes the automatic steering system 50 which may be used for automatically docking the boat 100 to a pier in the automatic docking mode. The control unit 10 is coupled to the automatic steering system 50, wherein the control unit 10 outputs (sends/transmits) control signals to the automatic steering system 50 to automatically drive the boat 100.

In more detail, the control unit 10 controls an automatic docking of the boat 100 via the automatic steering system 50. The control unit 10 may also determine an automatic docking route of the boat 100. In the present disclosure, docking may be used interchangeably with mooring, berthing and/or the like. That is to say, the control unit 10 controls an automatic docking, mooring and/or berthing of the boat 100 via the automatic steering system 50. The control unit 10 may also determine an automatic docking route, an automatic mooring route and/or an automatic berthing route of the boat 100.

The automatic steering system 50 may include, for example, sensors, switches and actuators and/or the like. For example, an actuator may be used for automatically turning the steering wheel. In another example, an actuator may be used for controlling the throttle. A switch may be used to switch the rotating direction of the motor to move forward or reverse. A sensor may be used to detect a position of the boat 100. A sensor(s) may be used for detecting objects in a surrounding of the boat 100.

Referring to FIG. 1, a user may switch an operation mode of the boat 100 to a manual driving mode by, for example, activating a manual switch 70. In addition the user may switch the operation mode of the boat 100 to an automatic docking mode by, for example, activating the auto dock switch 60. The auto dock switch 60 and the manual switch 70 may each be, for example, a physical push button, a touch button on an HMI (for example, the monitor 15 may be a capacitive touch screen) and/or the like. Each of the auto dock switch 60 and the manual switch 70 is an example of an input unit.

Referring to FIG. 1, when the user activates the auto dock switch 60, the control unit 10 is configured to switch a control mode of the control unit 10 to an automatic docking mode. When the control mode is switched to the automatic docking mode, the control unit 10 is configured to output a control signal to the automatic steering system 50 for controlling an automatic steering of the boat 100. When the control mode is switched to the manual driving mode, the control unit 10 is configured to not output the control signal for controlling the automatic steering of the boat 100, or to disengage the automatic steering system 50 of the boat 100 such that the boat 100 may be steered and/or controlled manually by the user.

Referring to FIG. 1, when the control mode of the control unit 10 is switched to the automatic docking mode via the auto dock switch 60, the control unit 10 is configured to output the control signal to the automatic steering system 50 to control an automatic steering of the boat 100 in accordance to the automatic mooring route calculated and/or set by the control unit 10.

In an embodiment of the disclosure, when the automatic docking of the boat 100 to the berth B is complete, the control unit 10 is configured to end the automatic docking mode by stopping the output of the control signal for controlling the automatic steering of the boat 100. In another embodiment of the disclosure, the control unit 10 is configured to end the automatic docking mode by not outputting the control signal for controlling the automatic steering of the boat 100. In another embodiment of the disclosure, the control unit 10 is configured to end the automatic docking mode by outputting a control signal to the automatic steering system 50 for stopping the automatic steering of the boat 100. In another embodiment of the disclosure, the control unit 10 is configured to end the automatic docking mode by disengaging the automatic steering system 50 of the boat 100 such that the boat 100 may be steered and/or controlled manually by the user. In another embodiment of the disclosure, the control unit 10 is configured to end the automatic docking mode by switching the control mode of the control unit 10 to another mode. The manual driving mode is an example of another mode.

Referring to FIG. 1, a first GPS receiver 40, a second GPS receiver 50 and an inertial measurement unit (IMU) 70 are coupled to the control unit 10. The first GPS receiver 40 and the second GPS receiver 60 are examples of a Global Navigation Satellite System (GNSS) receiver. The first GPS receiver 40 may include an antenna. The second GPS receiver 60 may include an antenna. The IMU 70 may include, for example, a gyroscope. The control unit 10 may obtain position coordinates of the boat 100 via the first GPS receiver 40 and/or the second GPS receiver 60. The first GPS receiver 40 position coordinates of the boat 100 may include, for example, the longitude and latitude coordinates of the boat 100. The control unit 10 may obtain an orientation or pointing direction of the boat 100 via the IMU 70.

Figure 2:
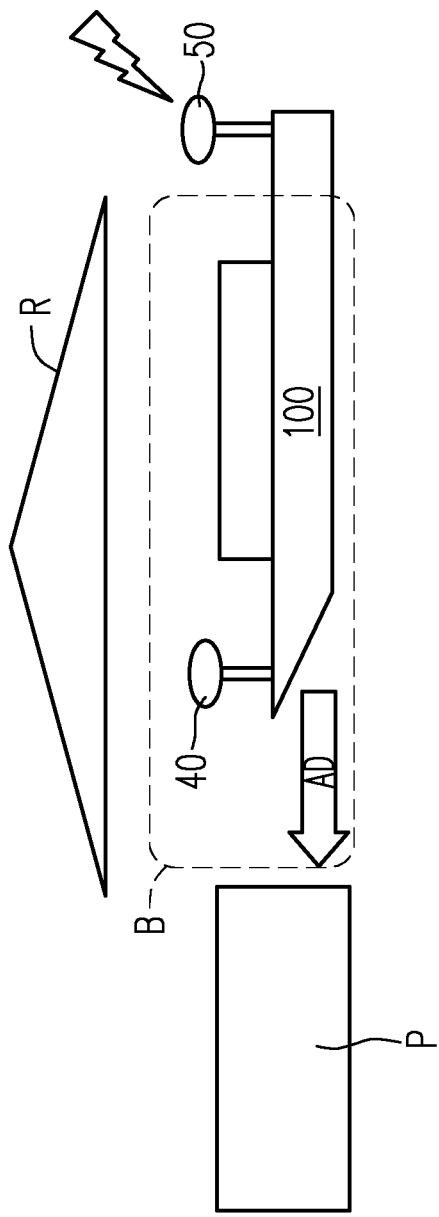
FIG. 2 is a schematic diagram illustrating a side view of a boat having an approach direction of bow first according to an embodiment of the disclosure.

FIG. 2 is a schematic diagram illustrating a side view of a boat having a approach direction of bow first according to an embodiment of the disclosure. Referring to FIG. 2, a roof R is disposed on top of a berth B. The roof R may be erected on top of a pier P. The boat 100 is to be moored at the berth B, and under the roof R. The first GPS receiver 40 is disposed at a bow side of the boat 100, and more specifically disposed at the bow of the boat 100. The second GPS receiver 50 is disposed at a stern side of the boat 100, and more specifically disposed at the stern of the boat 100.

Referring to FIG. 2, the control unit 10 determines whether an approach direction AD of the boat 100 to the berth B is bow first or stern first. After the control unit 10 determines the approach direction AD of the boat 100 to the berth B, the control unit 10 may select, based on the approach direction AD of the boat 100 to the berth B, the first GPS receiver 40 or the second GPS receiver 50 for determining a position of the boat 100.

In more detail, referring to FIG. 2, in the present embodiment, the approach direction AD of the boat 100 to the berth B is bow first. When the approach direction AD of the boat 100 to the berth B is bow first, the control unit 10 selects the second GPS receiver 50 disposed at the stern side of the boat 100 for determining the position of the boat 100. That is to say, when the approach direction AD of the boat 100 is bow first, the second GPS receiver 50 is used for determining the position of the boat 100. When the approach direction AD of the boat 100 to the berth B is bow first, the second GPS receiver 50 may not enter under the roof R at all, or may enter under the roof R later than the first GPS receiver 40 enters under the roof R. In this way, the GPS signal will not be cut off since the second GPS receiver 50 does not enter under the roof R at all, or the GPS signal may be cut off and/or weaken at a later time than the GPS signal received by the first GPS receiver 40. In this way, the GPS signal may be received by the second GPS receiver 50 until mooring of the boat 100 to the berth B is completed.

Figure 3:
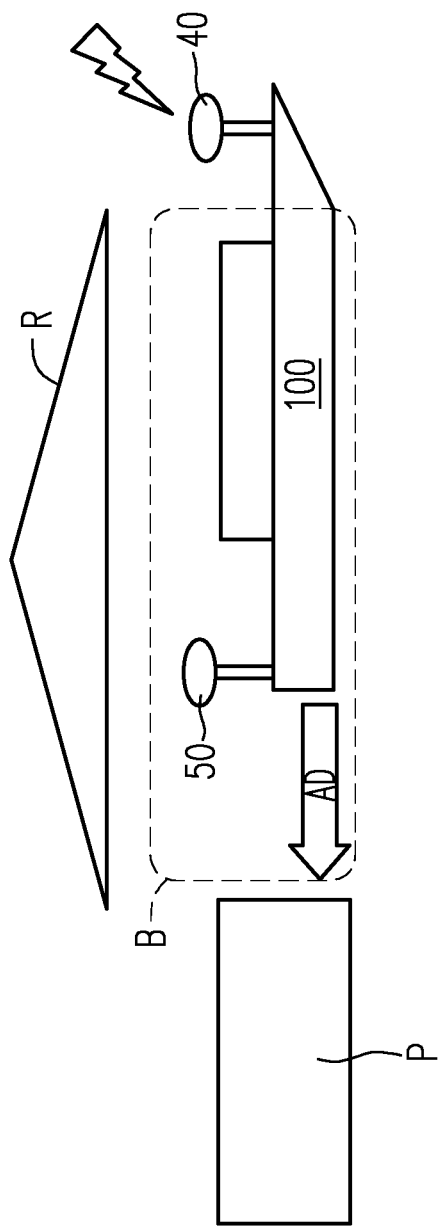
FIG. 3 is a schematic diagram illustrating a side view of a boat having an approach direction of stern first according to an embodiment of the disclosure.

FIG. 3 is a schematic diagram illustrating a side view of a boat having an approach direction of stern first according to an embodiment of the disclosure. Referring to FIG. 3, in the present embodiment, the approach direction AD of the boat 100 to the berth B is stern first. When the approach direction AD of the boat 100 to the berth B is stern first, that is to the boat 100 is backed into the berth B. When the approach direction AD of the boat 100 to the berth B is stern first, the control unit 10 selects the first GPS receiver 40 disposed at the bow side of the boat 100 for determining the position of the boat 100. That is to say, when the approach direction AD of the boat 100 is stern first, the first GPS receiver 40 is used for determining the position of the boat 100. When the approach direction AD of the boat 100 to the berth B is stern first, the first GPS receiver 40 may not enter under the roof R at all, or may enter under the roof R later than the second GPS receiver 50 enters under the roof R. In this way, the GPS signal will not be cut off since the first GPS receiver 40 does not enter under the roof R at all, or the GPS signal may be cut off and/or weakened at a later time than the GPS signal received by the second GPS receiver 50. In this way, the GPS signal may be received by the first GPS receiver 40 until mooring of the boat 100 to the berth B is completed.

The control unit 10 may determine the automatic docking of the boat 100 to the berth B is complete by, for example, the first GPS receiver 50 and/or the GPS receiver 60. That is to say, when the position coordinates of the boat 100 match with the position coordinates of the berth B, the control unit 10 may determine the automatic docking of the boat 100 to the berth B is completed.

The control unit 10 is configured to determine the approach direction AD of the boat 100 to the berth B. In an embodiment of the disclosure, the control unit 10 may determine the approach direction AD of the boat 100 to the berth B by a user inputting the approach direction AD to the control unit 10 via an input unit. That is to say, the approach direction AD of the boat 100 to the berth B may be input to the control unit 10 by a user via the input unit. In another embodiment of the disclosure, the control unit 10 may determine the approach direction AD of the boat 100 to the berth B based on GPS data of the boat 100 obtained from the first GPS receiver 40 and/or the second GPS receiver 60. That is to say, the control unit 10 may determine a travel direction of the boat 100 based on the GPS data of the boat 100, wherein the approach direction AD of the boat 100 may be determined from the travel direction of the boat 100. In another embodiment of the disclosure, the control unit 10 may determine the approach direction AD of the boat 100 to the berth based on image information 20. The image information 20 may be, for example, a lidar image, a camera image and/or the like. The image information 20 may be an image that is obtained in real time or an image that is stored in a memory. For example, the image information 20 may be obtained in real time from the lidar and/or the camera disposed on the boat 100. The control unit 10 may determine the approach direction AD of the boat 100 based on, for example, objects in the image becoming smaller or larger overtime. For example, if objects in the image become larger, then the control unit 10 may determine the boat 100 is moving toward a pointing direction of the camera and/or lidar. If objects in the image become smaller, then the control unit 10 may determine the boat 100 is moving away from a pointing direction of the camera and/or lidar. The above examples of the image information 20 are described as examples only and are not intended to limit the disclosure.

Lidar is an acronym for "light detection and ranging" or "laser imaging, detection, and ranging". The boat 100 may include the lidar for obtaining the lidar image. The boat 100 may include a camera having an image sensor for obtaining the camera image.

FIG. 4 is a schematic diagram illustrating a side view of a boat having a second GNSS receiver moved away from a bow of the boat according to an embodiment of the disclosure. Referring to FIG. 4, when the approach direction AD of the boat 100 to the berth B is bow first, the control unit 10 selects the second GPS receiver 50 for determining the position of the boat 100. However, even when the second GPS receiver 50 is selected for determining the position of the boat 100, there may still be a case that the GPS signal may be cut off and/or weakened due to the GPS signal being shielded or blocked by the roof R. Therefore, when a signal strength of the GPS signal detected by the second GPS receiver 50 is lower than a predetermined threshold, the control unit 10 controls the second GPS receiver 50 to move away from the bow of the boat 100 and away from the stern of the boat 100. That is to say, the control unit 10 controls the second GPS receiver 50 disposed at the stern of the boat 100 to move from a first position closer to the bow to a second position further away from the bow. In this way, the GPS signal may be received by the second GPS receiver 50 until mooring of the boat 100 to the berth B is completed.

FIG. 5 is a schematic diagram illustrating a side view of a boat having a first GNSS receiver moved away from a stern of the boat according to an embodiment of the disclosure. Referring to FIG. 5, when the approach direction AD of the boat 100 to the berth B is stern first, the control unit 10 selects the first GPS receiver 40 for determining the position of the boat 100. However, even when the first GPS receiver 40 is selected for determining the position of the boat 100, there may still be a case that the GPS signal may be cut off and/or weakened due to the GPS signal being shielded or blocked by the roof R. Therefore, when a signal strength of the GPS signal detected by the first GPS receiver 40 is lower than a predetermined threshold, the control unit 10 controls the first GPS receiver 40 to move away from the stern of the boat 100 and away from the bow of the boat 100. That is to say, the control unit 10 controls the first GPS receiver disposed at the bow of the boat 100 to move from a first position closer to the stern to a second position further away from the stern. In this way, the GPS signal may be received by the first GPS receiver 40 until mooring of the boat 100 to the berth B is completed.

In the above embodiment, an example was described where the number of the positions of the first GPS receiver 40 was two positions, and the number of positions of the second GPS receiver 50 was two positions. Namely, the first GPS receiver 40 is moved between two positions only, namely the first position and the second position based on the signal strength of the GPS signal relative to the predetermined threshold. In addition, the second GPS receiver 50 is moved between two positions only, namely the first position and the second position based on the signal strength of the GPS signal relative to the predetermined threshold. However, the disclosure is not limited thereto. That is to say, in another embodiment of the disclosure, the number of the positions of the first GPS receiver 40 and the second GPS receiver 50 may not be limited to two positions only.

In another embodiment of the disclosure, the position of the first GNSS receiver 50 may dynamically change according to the signal strength of the GPS signal. That is to say, a number of the positions of the first GPS receiver 40 is not limited to two positions only. Similarly, the position of the second GPS receiver 50 may dynamically change according to the signal strength of the GPS signal. That is to say, a number of the positions of the second GPS receiver 50 is not limited to two positions only. In more detail, the number of positions (first position, second position, third position, fourth position, etc.) for each of the first GPS receiver 40 and the second GPS receiver 50 may be set according to requirements. The relationship between the plurality of positions of the first GPS receiver 40 and the signal strength of the GPS signal may be predetermined, and may be set by a user according to requirements. The relationship between the plurality of positions of the second GPS receiver 50 and the signal strength of the GPS signal may be predetermined, and may be set by a user according to requirements.

Figure 6:
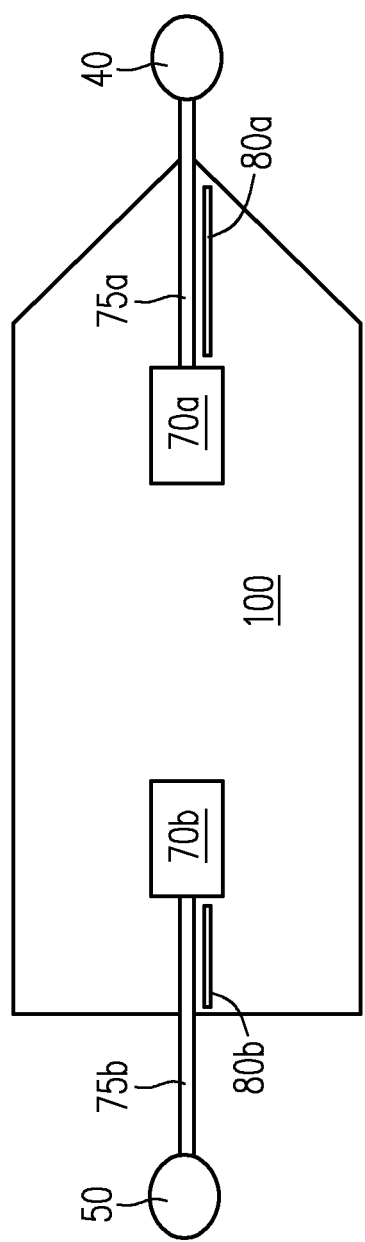
FIG. 6 is a schematic diagram illustrating a boat having a movable first GNSS receiver and a movable second GNSS receiver according to an embodiment of the disclosure.

FIG. 6 is a schematic diagram illustrating a top view of a boat having a movable first GNSS receiver and a movable second GNSS receiver according to an embodiment of the disclosure. Referring to FIG. 6, the boat 100 may include a first rail 80*a* and a second rail 80*b*. The first rail 80*a* and the second rail 80*b* are examples of a rail of the disclosure. The first rail 80*a* guides a movement of the first GPS receiver 40 in the front-rear direction of the boat 100, while the second rail 80*a* guides a movement of the second GPS receiver 50 in the front-rear direction of the boat 100. The front-rear direction of the boat 100 may be, for example, a bow-stern direction of the boat 100. A number of the rails is not intended to limit the disclosure and may be set according to requirements.

Referring to FIG. 6, the boat 100 includes a first actuator system 70*a* moving a position of the first GPS receiver 40 in the front-rear direction of the boat 100. The first actuator system 70*a* is a power source, and includes a first actuator. More specifically, the first actuator includes a power source that moves a position of the first GPS receiver 40 in the front-rear direction of the boat 100. In the present embodiment, the first actuator of the first actuator system 70*a* is a hydraulic cylinder. However, the disclosure is not limited thereto. In another embodiment of the disclosure, the first actuator system 70*a* may be, for example, an air cylinder, an electric motor (for example, a step motor, a servo motor, a DC motor, an AC motor and the like) having a ball screw/lead screw attached to an output shaft of the electric motor and/or the like. The hydraulic cylinder (first actuator system 70*a*) includes a first shaft 75*a* that extends and retracts, and may be controlled by the control unit 10. The first GPS receiver 40 is fixed to an end of the first shaft 75*a* to be extended and retracted via the first shaft 75*a*. The first actuator moves the first GPS receiver 40 in the front-rear direction of the boat 100. After docking of the boat 100 to the berth B is completed, the control unit 10 is configured to control the first GPS receiver 40 to move towards the stern of the boat 100 to the first position.

Referring to FIG. 6, the boat 100 includes a second actuator system 70*b* moving a position of the second GPS receiver 50 in the front-rear direction of the boat 100. The second actuator system 70*b* is a power source, and includes a second actuator. More specifically, the second actuator includes a power source that moves a position of the second GPS receiver 50 in the front-rear direction of the boat 100. In the present embodiment, the second actuator of the second actuator system 70*b* is a hydraulic cylinder. However, the disclosure is not limited thereto. In another embodiment of the disclosure, the second actuator system 70*b* may be, for example, an air cylinder, an electric motor (for example, a step motor, a servo motor, a DC motor, an AC motor and the like) having a ball screw/lead screw attached to an output shaft of the electric motor and/or the like. The hydraulic cylinder (second actuator system 70*b*) includes a second shaft 75*b* that extends and retracts, and may be controlled by the control unit 10. The second GPS receiver 50 is fixed to an end of the second shaft 75*b* to be extended and retracted via the second shaft 75*b*. The second actuator moves the second GPS receiver 50 in the front-rear direction of the boat 100. After docking of the boat 100 to the berth B is completed, the control unit 10 is configured to control the second GPS receiver 50 to move towards the bow of the boat 100 to the first position.

Referring to FIG. 6, the first rail 80*a* and the second rail 80*b* are fixed to the boat 100. More specifically, the first rail 80*a* and the second rail 80*b* may be fixed to the boat 100 by, for example, a bolt(s) and/or welding. The first rail 80*a* guide a movement of the first GPS receiver in the front-rear direction of the boat 100 when the first actuator system 70*a* moves the first GPS receiver 40. The second rail 80*b* guide a movement of the second GPS receiver 50 in the front-rear direction of the boat 100 when the second actuator system 70*b* moves the second GPS receiver 50. More specifically, a first linear block may be coupled or fixed to the first shaft 75*a* or the first GPS receiver 40, wherein the first linear block slides on the first rail 80*a* such that the first rail 80*a* guides the first GPS receiver 40 and/or the first shaft 75*a* when the first GPS receiver is moved by the hydraulic cylinder (the first actuator system 70*a*). Similarly, a second linear block may be coupled or fixed to the second shaft 75*b* or the second GPS receiver 50, wherein the second linear block slides on the second rail 80*b* such that the second rail 80*b* guides the second GPS receiver 50 and/or the second shaft 75*a* when the second GPS receiver 50 is moved by the hydraulic cylinder (the second actuator system 70*b*).

Referring to FIG. 4 and FIG. 5, the first GPS receiver 40 and the second GPS receiver 50 may be disposed, for example, on top of a deck D of the boat 100. In more detail, the deck D may be an upper deck of the boat 100. The deck D is a platform that covers a hull H of the boat 100. In this way, when the first GPS receiver 40 or the second GPS receiver 50 is extended, the first GPS receiver 40 may extend past the bow of the boat 100 and hang over an edge of the boat 100, and the second GPS receiver 50 may also extend past the stern of the boat 100 and hang over an edge of the boat 100. In the present embodiment, the first rail 80*a* and the second rail 80*b* are disposed at a side of the first shaft 75*a* and the second shaft 75*b*. However, the disclosure is not limited thereto. In another embodiment of the disclosure, for example, the first rail 80*a* and the second rail 80*b* may be disposed below the first shaft 75*a* and the second shaft 75*b*, such that the first rail 80*a* is between the deck D and the first shaft 75*a* and the second rail 80*b* is between the deck D and the second shaft 75*b*. In another embodiment of the disclosure, the first rail 80*a* may be fixed to the first shaft 75*a* while the first linear block is fixed to the boat 100, and/or the second rail 80*b* may be fixed to the second shaft 75*b* while the second linear block is fixed to the boat 100.

Figure 7:
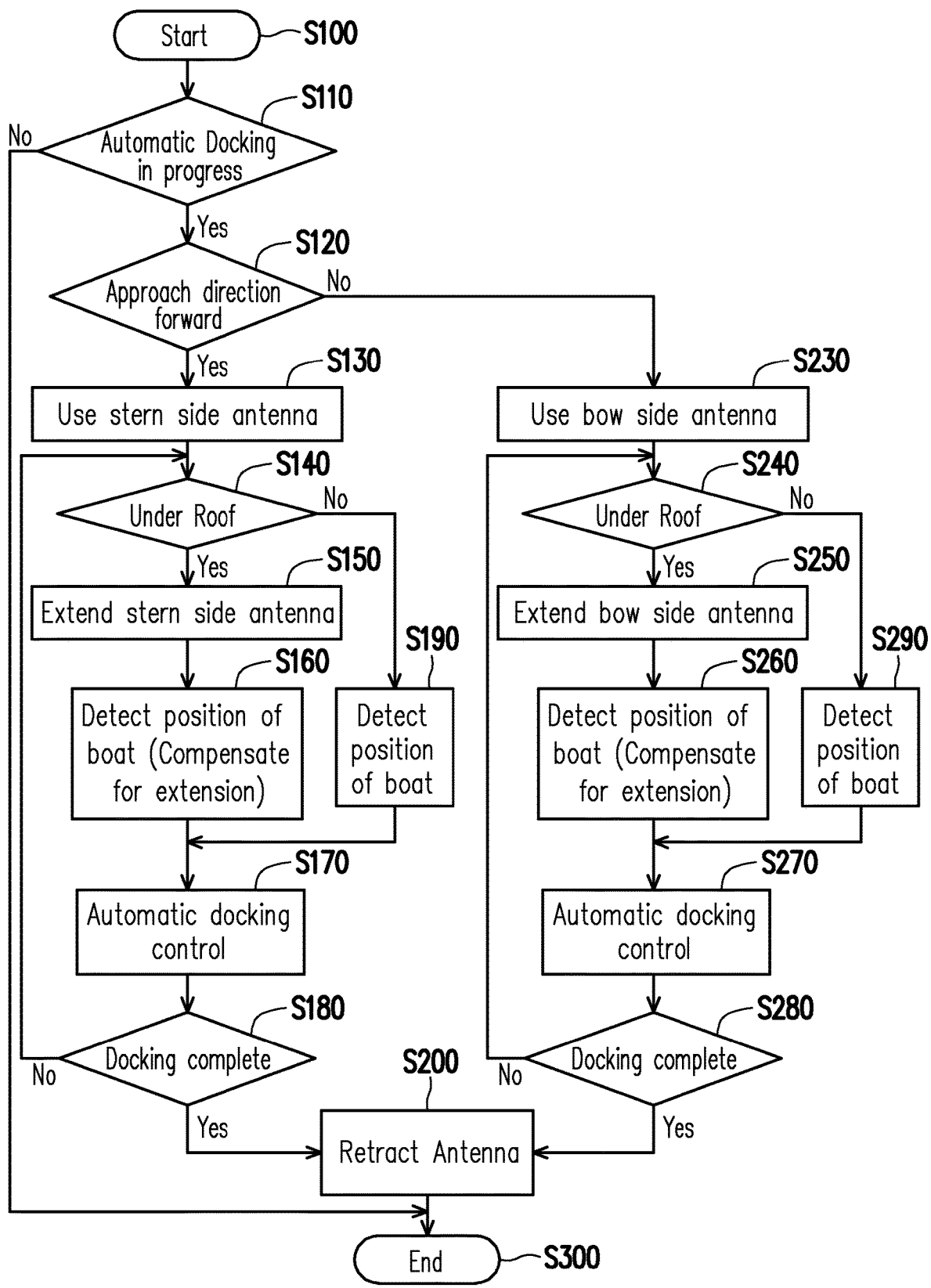
FIG. 7 is a flow chart illustrating an operation of a system for detecting a position of a boat that is moored under a roof according to an embodiment of the disclosure.

FIG. 7 is a flow chart illustrating an operation of a system for detecting a position of a boat that is moored under a roof according to an embodiment of the disclosure. Referring to FIG. 7, in step S110, the control unit 10 detects whether automatic docking is in progress. If yes, the control unit 10 determines if the approach direction AD of the boat 100 to the berth B is forward (bow first) in step S120. If the approach direction AD of the boat 100 is forward (bow first), the control unit 10 selects the stern side antenna (the second GPS receiver 50) to determine the position of the boat 100 as in step S130. Next, the control unit 10 determines whether the stern side antenna (the second GPS receiver 50) is under the roof R in step S140, for example, based on the signal strength of the GPS signal received by the stern side antenna. If the signal strength of the GPS signal is below a predetermined threshold in step S140, the control unit 10 controls the second actuator system 70*b* to extend the stern side antenna (the second GPS receiver 50) in step S150 such that the stern side antenna may stick out from under the roof R. After the stern side antenna is extended in step S150, the stern side antenna is used to detect the position of the boat 100 in step S160. In step 160, the control unit 10 may compensate the position of the boat 100 obtained by the stern side antenna with the length that the stern side antenna was extended. If the signal strength of the GPS signal is below a predetermined threshold in step S140, the control unit 10 does not extend the stern side antenna (the second GPS receiver 50) to detect the position of the boat 100 in step S190 since the signal strength of the GPS signal is sufficient to determine the position of the boat 100. After the position of the boat 100 is detected in step S160 or step S190, the control unit continues the automatic docking control to moor the boat 100 to the berth B in step S170. Next, in step S180, the control unit 10 detects whether automatic docking of the boat 100 to the berth B is completed. If the automatic docking is completed, the control unit 10 retracts the stern side antenna in step S200.

If the approach direction AD of the boat 100 determined in step S120 is rearward (stern first), the control unit 10 selects the bow side antenna (the first GPS receiver 40) to determine the position of the boat 100 as in step S230. Next, the control unit 10 determines whether the bow side antenna (the first GPS receiver 40) is under the roof R in step S240, for example, based on the signal strength of the GPS signal received by the bow side antenna. If the signal strength of the GPS signal is below a predetermined threshold in step S240, the control unit 10 controls the first actuator system 70*a* to extend the bow side antenna (the first GPS receiver 40) in step S250 such that the bow side antenna may stick out from under the roof R. After the bow side antenna is extended in step S250, the bow side antenna is used to detect the position of the boat 100 in step S260. In step 260, the control unit 10 may compensate the position of the boat 100 obtained by the bow side antenna with the length that the bow side antenna was extended. If the signal strength of the GPS signal is below a predetermined threshold in step S240, the control unit 10 does not extend the bow side antenna (the first GPS receiver 40) to detect the position of the boat 100 in step S290 since the signal strength of the GPS signal is sufficient to determine the position of the boat 100. After the position of the boat 100 is detected in step S260 or step S290, the control unit continues the automatic docking control to moor the boat 100 to the berth B in step S270. Next, in step S280, the control unit 10 detects whether automatic docking of the boat 100 to the berth B is completed. If the automatic docking is completed, the control unit 10 retracts the bow side antenna in step S200.

In the embodiments above, it was described the control unit 10 may select, based on the approach direction AD of the boat 100 to the berth B, the first GPS receiver 40 or the second GPS receiver 50 for determining the position of the boat 100. Similarly, during departure of the boat 100 from the berth B, the control unit 10 may select the first GPS receiver 40 or the second GPS receiver 50 for determining the position of the boat 100 at departure, based on a last configuration of the boat 100 stored in the memory of the control unit 10. For example, when the first GPS receiver 40 was selected for determining the position of the boat 100 during the last docking of the boat 100 to the berth B, then the control unit 10 may select the first GPS receiver for determining the position of the boat 100 during the departure of the boat 100 from the berth B. In another example, when the second GPS receiver 50 was selected for determining the position of the boat 100 during the last docking of the boat 100 to the berth B, then the control unit 10 may select the second GPS receiver 50 for determining the position of the boat 100 during the departure of the boat 100 from the berth B. Namely, the first GPS receiver 40 or the second GPS receiver 50 that was last selected by the control unit 10 for determining the position of the boat 100 may be stored in the memory of the control unit 10. In another embodiment of the disclosure, during departure of the boat 100 from the berth B, the user may manually select the first GPS receiver 40 or the second GPS receiver 50 for determining the position of the boat 100 via, for example, the input unit.

In addition, the control unit 10 stores in memory whether the first GPS receiver 40 was extended to the second position or the second GPS receiver 50 was extended to the second position during the last docking of the boat 100 to the berth B. For example, when the first GPS receiver was extended during the last docking of the boat 100 to the berth B, then the control unit 10 may extend the first GPS receiver 40 during/prior to the departure of the boat 100 from the berth B. In another example, when the second GPS receiver 50 was extended during the last docking of the boat 100 to the berth B, then the control unit 10 may extend the second GPS receiver 50 during/prior to the departure of the boat 100 from the berth B. Namely, whether the first GPS receiver 40 or the second GPS receiver 50 was extended during the last docking to the berth B is stored in the memory of the control unit 10. In another embodiment of the disclosure, during departure of the boat 100 from the berth B, the user may manually select the first GPS receiver 40 or the second GPS receiver 50 for extending via, for example, the input unit, wherein the control unit 10 then sends control signals to the first actuator system 70*a* and/or the second actuator system 70*b* drive the first GPS receiver 40 and/or the second GPS receiver 50 to move.

In the above described embodiments, the first GPS receiver 40 or the second GPS receiver 50 for determining the position of the boat 100 was automatically selected by the control unit 10. However, the first GPS receiver 40 or the second GPS receiver 50 for determining the position of the boat 100 may be manually selected by the user via, for example, the input unit. Similarly, in the above described embodiments, the first GPS receiver 40 or the second GPS receiver 50 was automatically extended by the control unit 10. However, the first GPS receiver or the second GPS receiver 50 may be manually extended by the user via, for example, the input unit.

In an embodiment of the disclosure, the first GPS receiver 40 and/or the second GPS receiver 50 may have a telescopic configuration, for example, a telescopic antenna that may be automatically extended and retracted telescopically.

In the embodiments above, it was described the control unit 10 may select, based on the approach direction AD of the boat 100 to the berth B, the first GPS receiver 40 or the second GPS receiver 50 for determining the position of the boat 100. It should be noted, the control unit may select the first GPS receiver 40 or the second GPS receiver 50 in both the manual driving mode and the automatic driving mode. In addition, it was described the control unit 10 may extend the first GPS receiver 40 and/or the second GPS receiver 50. It should be noted the control unit 10 may extend the first GPS receiver 40 or the second GPS receiver 50 in both the manual driving mode and the automatic driving mode.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A control system, adapted for a boat having a first GNSS receiver disposed at a bow side of the boat, and a second GNSS receiver disposed at a stern side of the boat, the control system comprising:
a control unit, comprising a processor, configured to:
determine whether an approach direction of the boat to a berth is bow first or stern first,
select, based on the approach direction, the first GNSS receiver or the second GNSS receiver for determining a position of the boat,
wherein the control unit obtains roof information regarding whether the berth includes a roof,
the control unit selects the first GNSS receiver or the second GNSS receiver for determining a position of the boat, based on the approach direction and the roof information obtained.

2. A control system, adapted for a boat having a first GNSS receiver disposed at a bow side of the boat, and a second GNSS receiver disposed at a stern side of the boat, the control system comprising:
a control unit, comprising a processor, configured to:
determine whether an approach direction of the boat to a berth is bow first or stern first,
select, based on the approach direction, the first GNSS receiver or the second GNSS receiver for determining a position of the boat,
wherein when the approach direction of the boat to the berth is bow first, the control unit selects the second GNSS receiver disposed at the stern side of the boat for determining the position of the boat.

3. The control system according to claim 2, wherein when the approach direction of the boat to the berth is stern first, the control unit selects the first GNSS receiver disposed at the bow side of the boat for determining the position of the boat.

4. The control system according to claim 2, wherein the control unit controls the second GNSS receiver to move away from the bow of the boat.

5. The control system according to claim 3, wherein the control unit controls the first GNSS receiver to move away from the stern of the boat.

6. The control system according to claim 1, wherein the approach direction of the boat to the berth is input to the control unit by a user.

7. The control system according to claim 1, wherein the control unit determines the approach direction of the boat to the berth based on GNSS data of the boat.

8. The control system according to claim 4, wherein after docking of the boat to the berth is completed, the control unit controls the second GNSS receiver to move towards the bow of the boat.

9. The control system according to claim 5, wherein after docking of the boat to the berth is completed, the control unit controls the first GNSS receiver to move towards the stern of the boat.

10. The control system according to claim 1, wherein the roof information is obtained based on an aerial image, a satellite image, or a camera image of a camera disposed on the boat.

11. A boat, comprising:
the control system according to claim 1,
a first GNSS receiver disposed at a bow side of the boat, and
a second GNSS receiver disposed at a stern side of the boat.

12. A control system, adapted for a moving object having a first GNSS receiver disposed at a front side of the moving object, and a second GNSS receiver disposed at a rear side of the moving object, the control system comprising:
a control unit, comprising a processor, configured to:
determine whether an approach direction of the moving object to a target position is front first or rear first,
select, based on the approach direction, the first GNSS receiver or the second GNSS receiver for determining a position of the moving object,
wherein when the approach direction of the moving object to the target position is front first, the control unit selects the second GNSS receiver disposed at the rear side of the moving object for determining the position of the moving object.

13. The control system according to claim 12, wherein when the approach direction of the moving object to the target position is rear first, the control unit selects the first GNSS receiver disposed at the front side of the moving object for determining the position of the moving object.

14. The control system according to claim 12, wherein the control unit controls the second GNSS receiver to move away from the front of the moving object.

15. The control system according to claim 13, wherein the control unit controls the first GNSS receiver to move away from the rear of the moving object.

* * * * *